(12) United States Patent
Chang et al.

(10) Patent No.: US 8,374,139 B2
(45) Date of Patent: Feb. 12, 2013

(54) LOW LATENCY SYNCHRONIZATION SCHEME FOR WIRELESS OFDMA SYSTEMS

(75) Inventors: Yu-Hao Chang, Daya Township (TW); Pei-Kai Liao, Mingjian Xiang (TW)

(73) Assignee: Mediatek Inc. (TW)

( * ) Notice: Subject to any disclaimer, the term of this patent is extended or adjusted under 35 U.S.C. 154(b) by 386 days.

(21) Appl. No.: 12/655,520

(22) Filed: Dec. 30, 2009

(65) Prior Publication Data

US 2010/0246508 A1    Sep. 30, 2010

Related U.S. Application Data

(60) Provisional application No. 61/163,934, filed on Mar. 27, 2009, provisional application No. 61/168,638, filed on Apr. 13, 2009.

(51) Int. Cl.
*H04W 4/00*    (2009.01)

(52) U.S. Cl. ......... 370/329; 370/328; 370/330; 370/334

(58) Field of Classification Search .......... 370/293, 370/316, 502, 276, 329, 337, 376, 477, 342, 370/345, 458, 492, 476; 455/431, 7–25, 455/444, 436, 515
See application file for complete search history.

(56) References Cited

U.S. PATENT DOCUMENTS

| | | | |
|---|---|---|---|
| 2006/0256709 A1 | 11/2006 | Yang | 370/206 |
| 2007/0286107 A1* | 12/2007 | Singh et al. | 370/312 |
| 2007/0297379 A1 | 12/2007 | Gorokhov et al. | 370/338 |
| 2008/0095195 A1* | 4/2008 | Ahmadi et al. | 370/478 |
| 2009/0010312 A1* | 1/2009 | Han et al. | 375/145 |
| 2009/0103569 A1* | 4/2009 | Cho et al. | 370/498 |
| 2009/0232079 A1 | 9/2009 | Khandekar et al. | 370/329 |

FOREIGN PATENT DOCUMENTS

| | | |
|---|---|---|
| WO | WO2007149997 A2 | 6/2006 |
| WO | WO2008070316 A2 | 10/2006 |

OTHER PUBLICATIONS

3GPP TS 36.211 V8.4.0 (Sep. 2008) Technical Specification, 3rd Generation Partnership Project; Technical Specification Group Radio Access Network; Evolved Universal Terrestrial Radio Access (E-UTRA); Physical Channels and Modulation (Release 8), pp. 68-72.

International Search Report and Written Opinion of International Search Authority for PCT/CN2010/070119 dated Apr. 22, 2010 (10 pages).

SIPO, the First Examination Opinion of Chinese patent application 201080000766.X dated Sep. 19, 2012. (4 pages).

SIPO, Search Report of Chinese patent application 201080000766.X(2 pages).

* cited by examiner

*Primary Examiner* — Hassan Phillips
*Assistant Examiner* — Anez Ebrahim
(74) *Attorney, Agent, or Firm* — Imperium Patent Works; Zheng Jin

(57) ABSTRACT

In advanced wireless OFDMA communication systems, hierarchical synchronization is adopted to synchronize between a base station (BS) and a mobile station (MS). In a hierarchical synchronization architecture, primary advanced preamble (PA-Preamble) is used for coarse time domain synchronization while cell ID is detected using several accumulated secondary advanced preambles (SA-Preambles). Network entry latency can be reduced by adjusting the relative location of superframe header (SFH), PA-Preamble and SA-Preambles within a superframe. Three different synchronization channel (SCH) architectures are proposed to provide different tradeoffs between network entry latency and the robustness of SA-Preamble design and cell ID detection.

12 Claims, 5 Drawing Sheets

METHOD OF HIERARCHICAL SYNCHRONIZATION IN A CELLULAR OFDMA NETWORK

LOW LATENCY SYNCHRONIZATION SCHEME FOR WIRELESS OFDMA SYSTEMS

CROSS REFERENCE TO RELATED APPLICATIONS

This application claims priority under 35 U.S.C. §119 from U.S. Provisional Application No. 61/163,934, entitled "Synchronous Scheme for Advanced Wireless OFDMA Communication Systems," filed on Mar. 27, 2009; U.S. Provisional Application No. 61/168,638, entitled "Low Latency Synchronization Scheme for Advanced Wireless OFDMA Communication Systems," filed on Apr. 13, 2009, the subject matter of which is incorporated herein by reference.

TECHNICAL FIELD

The present invention relates generally to cellular OFDM systems and, more particularly, to low latency network synchronization for base stations in advanced wireless OFDMA communication systems.

BACKGROUND

In wireless communication systems, such as defined by IEEE 802.16m specification, base stations and mobile stations communicate with each other by sending and receiving data carried in a series of superframes. Before a mobile station can access a base station, physical (PHY) layer synchronization and Media Access Control (MAC) layer synchronization are performed. Upon power-on, a mobile station first acquires downlink (DL) synchronization and adjusts its timing, frequency and power via synchronization channel (SCH) broadcasted by a serving base station. After DL synchronization, the mobile station acquires uplink (UL) PHY layer synchronization via ranging procedures and MAC layer synchronization via network entry procedures with the serving base station.

A synchronization channel (SCH) is a radio resource region within each superframe that is used for preamble transmission by base stations. A preamble is a predefined code sequence used to facilitate network synchronization. In general, preambles are designed to achieve the following goals: to provide a reliable reference signal in both time domain and frequency domain for network synchronization; to support channel estimation for data and superframe header (SFH) decoding; to provide DL channel quality indicator (CQI) measurement and receive signal strength indicator (RSSI) measurement; to reduce network entry latency; and to minimize communication overhead. Well-designed SCH structure is thus desirable to achieve those goals.

In current IEEE 802.16m wireless systems, a hierarchical two-stage synchronization scheme has been proposed. In a first stage, a primary advanced-preamble (PA-Preamble) is used to provide coarse timing synchronization. In a second stage, multiple secondary advanced-preambles (SA-Preambles) are used to provide fine timing synchronization and cell ID detection. Both PA-Preamble and SA-Preambles are time-domain multiplexed within one superframe. For example, each superframe has four frames, and one PA-Preamble and three SA-Preambles are distributed in each frame within one superframe. It remains a challenge to design a hierarchical SCH structure that reduces network latency and/or provides a desirable tradeoff between network entry latency and the robustness of cell ID detection.

SUMMARY

In advanced wireless OFDMA communication systems, hierarchical synchronization is adopted to provide synchronization between a base station-(BS) and a mobile station (MS). In a hierarchical synchronization architecture, primary advanced preamble (PA-Preamble) is used for coarse time domain synchronization while cell ID is detected using several accumulated secondary advanced preambles (SA-Preambles). The number of SA-Preambles being accumulated in time domain to provide faithful cell-ID information depends on network environment and the robustness of preamble sequence design, which in turn determines network entry latency. Well-designed synchronization architecture can reduce network entry latency without scarifying system performance. In general, network entry latency can be reduced by adjusting the relative location of superframe header (SFH), PA-Preamble and SA-Preambles within a superframe.

Three different synchronization channel (SCH) architectures are proposed to provide different tradeoffs between network entry latency and the robustness of SA-Preamble design and cell ID detection. In a first embodiment, a proposed S-P-S-S preamble allocation scheme provides robust cell ID detection with reduced network entry latency for various network environments. In a second embodiment, a proposed S-S-P-S preamble allocation scheme provides a good balance between high reliability of cell ID detection and low network entry latency. In a third embodiment, a proposed S-S-S-P preamble allocation scheme provides reasonable reliability of cell ID detection and lowest network entry latency for simple network configuration with good channel condition and robust SA-Preamble design.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
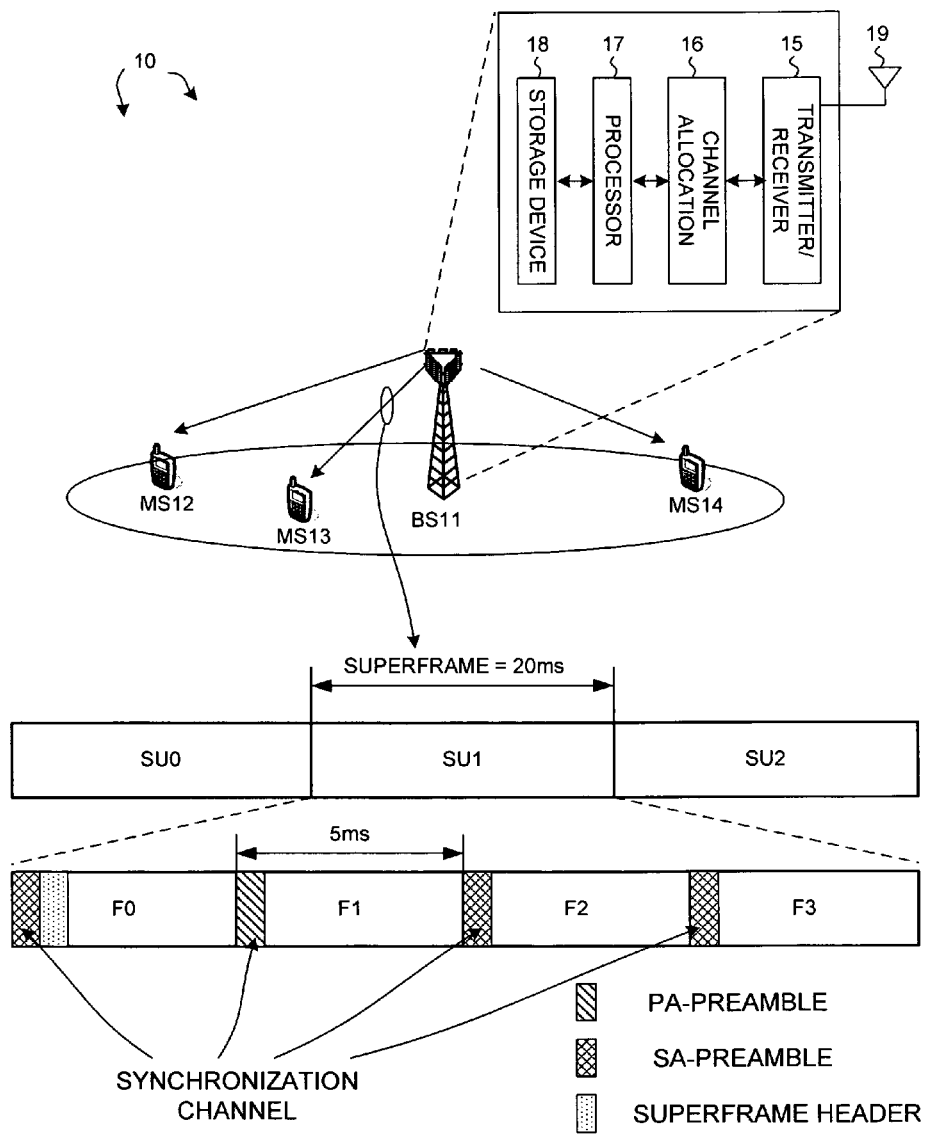
FIG. 1 illustrates a cellular OFDMA system with downlink synchronization in accordance with one novel aspect.

FIG. 1 illustrates a cellular OFDMA system 10 with hierarchical downlink synchronization in accordance with one novel aspect. Cellular OFDMA system 10 comprises base station BS11 and mobile stations MS12, MS13 and MS14. Base station BS11 comprises a radio frequency (RF) transmitter and receiver module 15, a synchronization channel (SCH) allocation module 16, a processor 17, a storage device 18, and an antenna 19 that is coupled to RF transmitter and receiver 15. Upon power-on, multiple mobile stations MS12, MS13 and MS14 receive radio signals broadcasted from base station BS11. Before the mobile stations can access BS11 and communicate data, downlink (DL) physical layer synchronization is required. The mobile stations make timing, frequency, and power adjustments via synchronization channel (SCH) monitoring and tracking during DL synchronization.

In the example of cellular OFDMA system 10, base station BS11 and mobile stations MS12, MS13, and MS14 communicate with each other by sending and receiving data carried via radio resource blocks in superframe structure. Each superframe (e.g., SU0, SU1, or SU2) contains four frames (e.g., F0, F1, F2, and F3). A synchronization channel (SCH) is a radio resource region allocated within each superframe that is used to carry preambles to facilitate DL synchronization. In general, a SCH comprises one or multiple predefined preamble code sequences transmitted from the base station. Based on the received preamble code sequences, the mobile stations are able to obtain reliable reference signals in both time and frequency domain for DL synchronization. In addition, the mobile stations are able to perform channel estimation for data or superframe header (SFH) decoding.

As illustrated in FIG. 1, a hierarchical two-stage synchronization scheme is used for DL synchronization. In a first synchronization stage, a primary advanced-preamble (PA-Preamble) is used to provide coarse timing synchronization. PA-Preamble also carries partial system information, e.g., carrier type and carrier bandwidth. PA-Preamble is usually common among base stations in the same frequency spectrum. Typically, frequency reuse 1 is applied for PA-Preamble transmission. In a second synchronization stage, multiple secondary advanced-preambles (SA-Preambles) are used to provide fine timing synchronization and cell ID detection. SA-Preamble is usually different among various base stations. Typically, frequency reuse 3 is applied for SA-Preamble transmission. Both PA-Preamble and multiple SA-Preambles are time-domain multiplexed (TDM) within one superframe.

In one novel aspect, SCH allocation module 16 of BS11 allocates PA-Preamble and multiple SA-Preambles such that desirable tradeoff between network latency and the robustness of cell ID detection is achieved. In the example of FIG. 1, one PA-Preamble is allocated in the first OFDM symbol of the second frame (i.e., F1) within each superframe, while each of the three SA-Preambles is allocated in the first OFDM symbol of the corresponding first, third, and fourth frame (i.e., F0, F2, and F3) within each superframe respectively. Each superframe also contains a superframe header (SFH), which carries system information and is typically located in the second OFDM symbol of the first frame. By allocating the PA-Preamble after the SFH, mobile stations are able to decode the SFH information in a time duration that is less than the superframe length (i.e., 20 ms).

Figure 2:
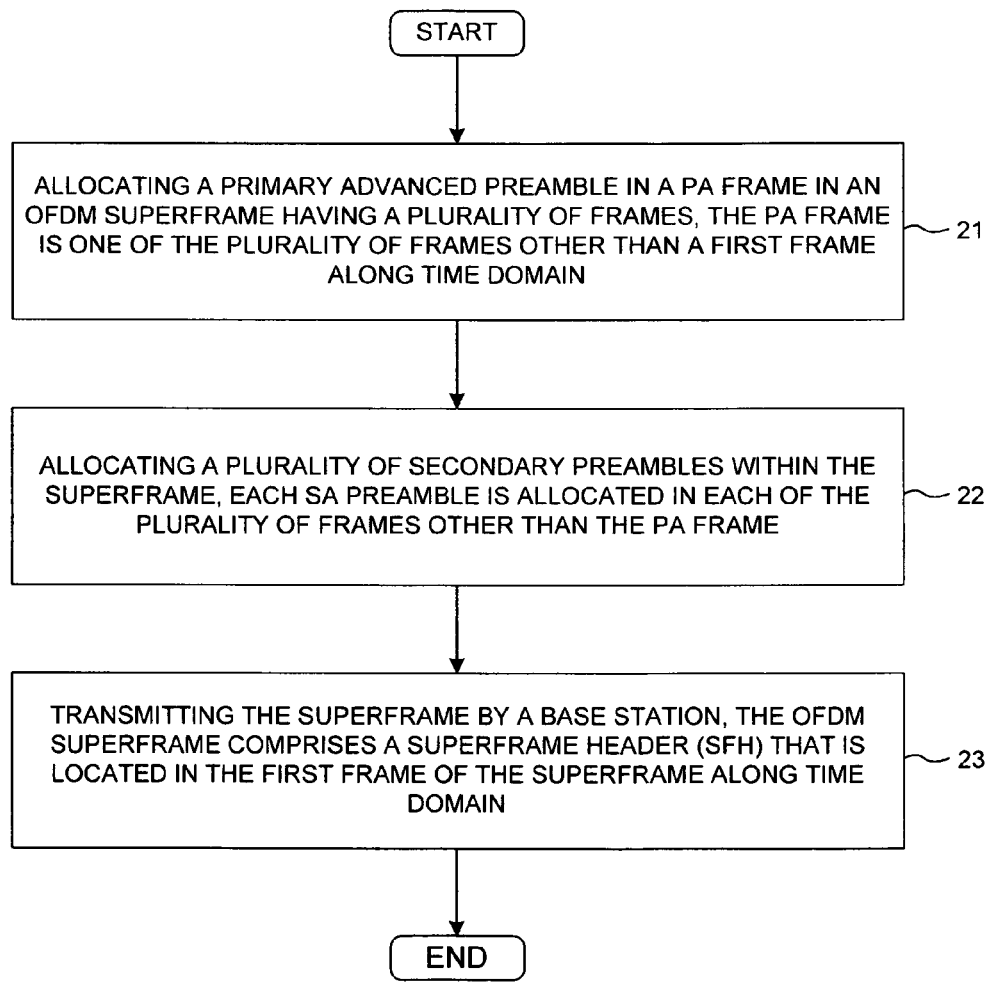
FIG. 2 illustrates a flow chart of a method of downlink synchronization in accordance with one novel aspect.

FIG. 2 illustrates a flow char of a method of hierarchical DL synchronization in a cellular OFDMA system in accordance with one novel aspect. During DL synchronization, a PA-Preamble and multiple SA preambles are broadcasted to a mobile station via an allocated SCH in each superframe by a base station. In step 21, the base station first allocates one PA-Preamble as the first OFDM symbol in one of the frames within the superframe. The frame that carries the PA-preamble is denoted as a PA frame. The PA frame must not be the first frame (i.e., not frame F0) along time domain within the superframe. In step 22, the base station allocates one SA-Preamble in each of the remaining frames within the superframe. Each SA-Preamble is also allocated at the first OFDM symbol in each frame. However, no SA-Preamble is allocated in the PA frame. Finally, in step 23, the base station transmits the superframe with both PA-Preamble and SA-Preambles to the mobile station. The superframe also contains a SFH that carries system information and is located at the second OFDM symbol in the first frame (i.e., frame F0) along time domain within the superframe.

In one novel aspect, the above-described SCH allocation scheme for hierarchical DL synchronization is able to reduce network entry latency without scarifying system performance as compared to other traditional SCH allocation schemes. Network entry latency of a mobile station is defined as the delay between the time of receiving a first PA-Preamble and the time of starting data communication. In a traditional preamble allocation scheme, a PA-Preamble is always allocated together with a SFH. In a four-frame superframe structure, for example, both PA-Preamble and SFH are allocated in the first frame, while three SA-Preambles are allocated in the next three frames along the time domain within the superframe. Based on such traditional preamble allocation scheme, network entry latency is always equal to at least one superframe length (i.e., 20 ms). This is because the mobile station is only able to start data communication after decoding SFH information successfully. Furthermore, the mobile station is only able to decode the SFH information after detecting complete cell ID information carried in SA-Preambles. As a result, after receiving a first PA-Preamble and one SFH in the first frame of the current superframe, the mobile station always accumulate three SA-Preambles for complete cell ID detection before receiving another SFH in the next superframe. Consequently, the mobile station must wait at least four frames to decode the SFH information in the next superframe and then start data communication. Therefore, in this traditional preamble allocation scheme, network entry latency is always equal to at least one superframe length (i.e., 20 ms).

On the other hand, with more details described below, under the novel SCH allocation scheme described above with respect to FIG. 2, network entry latency may be reduced without scarifying system performance. Furthermore, in many network environments, using three accumulated SA-Preambles for cell ID detection is not necessary. Depending on the transmission channel condition and the preamble sequence design, successful cell ID detection may be obtained using less than three SA-Preambles. A novel PA-Preamble and SA-Preamble allocation thus can further reduce network entry latency. Reference will now be made in detail to different embodiments of the proposed SCH allocation scheme, examples of which are illustrated in the accompanying drawings.

Figure 3:
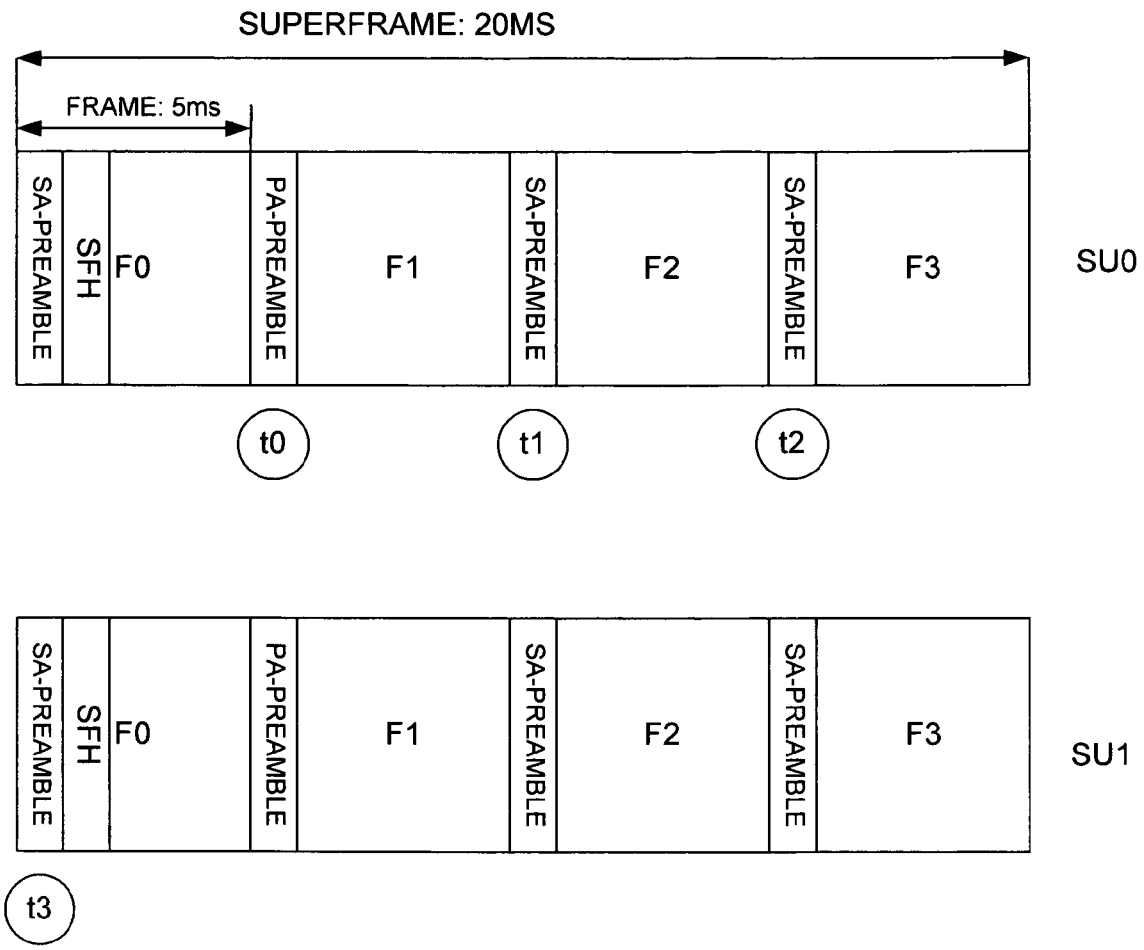
FIG. 3 illustrates a first SCH architecture that is used in a hierarchical synchronization scheme in an IEEE 802.16m system.

FIG. 3 illustrates a first embodiment of an SCH architecture that is used in a hierarchical synchronization scheme in an IEEE 802.16m system. This first embodiment is also referred to as an S-P-S-S preamble allocation scheme.) In the S-P-S-S allocation scheme, each PA-Preamble is allocated in the first OFDM symbol of the second frame (F1) within each superframe, while three SA-Preambles are allocated in the first OFDM symbol of the first, third and fourth frames respectively within each superframe. As illustrated in FIG. 3, at time t0, the mobile station receives a first PA-preamble, which is located in the first OFDM symbol in F1 of a current superframe SU0. The mobile station performs OFDM symbol synchronization and acquires subframe SA-Preamble offset. At time t1, the mobile station receives a first SA-Preamble, which is located in the first OFDM symbol of F2 in SU0. The mobile station then starts to seek cell ID by detecting the received SA-Preamble sequence.

Successful cell ID detection depends on network configuration and network condition. The mobile station may or may not be able to detect cell ID information using one received SA-Preamble. At time t2, the mobile station receives a second SA-Preamble, which is located in the first OFDM symbol of F3 in SU0. The mobile station seeks cell ID again if cell ID detection was failed at time t1. At time t3, the mobile station receives a third SA-Preamble, which is located in the first OFDM symbol of F0 in the next superframe SU1. The mobile station seeks cell ID again if cell ID detection was failed at both time t1 and time t2. Under normal network condition, cell ID detection is most likely to be successful at this time after three accumulated SA-Preambles. Immediately after time t3, the mobile station also receives another SFH located in the second OFDM symbol of F0 in SU1. Therefore, at time t3, the mobile station can successfully decode the SFH information received in SU1 with faithfully detected complete cell ID information. The mobile station thus is able to start data communication with the base station at time t3. As a result, in this S-P-S-S SCH allocation scheme, network entry latency is reduced to 15 ms (3×5 ms). It can be seen that because the PA-Preamble is allocated in the second frame in each superframe, three consecutive SA-Preambles are still accumulated for cell ID detection before decoding the SFH information. By allocating the PA-Preamble in the second frame in each superframe, the third accumulated SA-Preamble is allocated immediately before the SFH in each superframe. As a result, the same robustness of cell ID detection is achieved in this S-P-S-S allocation scheme as compared to traditional allocation scheme while network entry latency is reduced.

Figure 4:
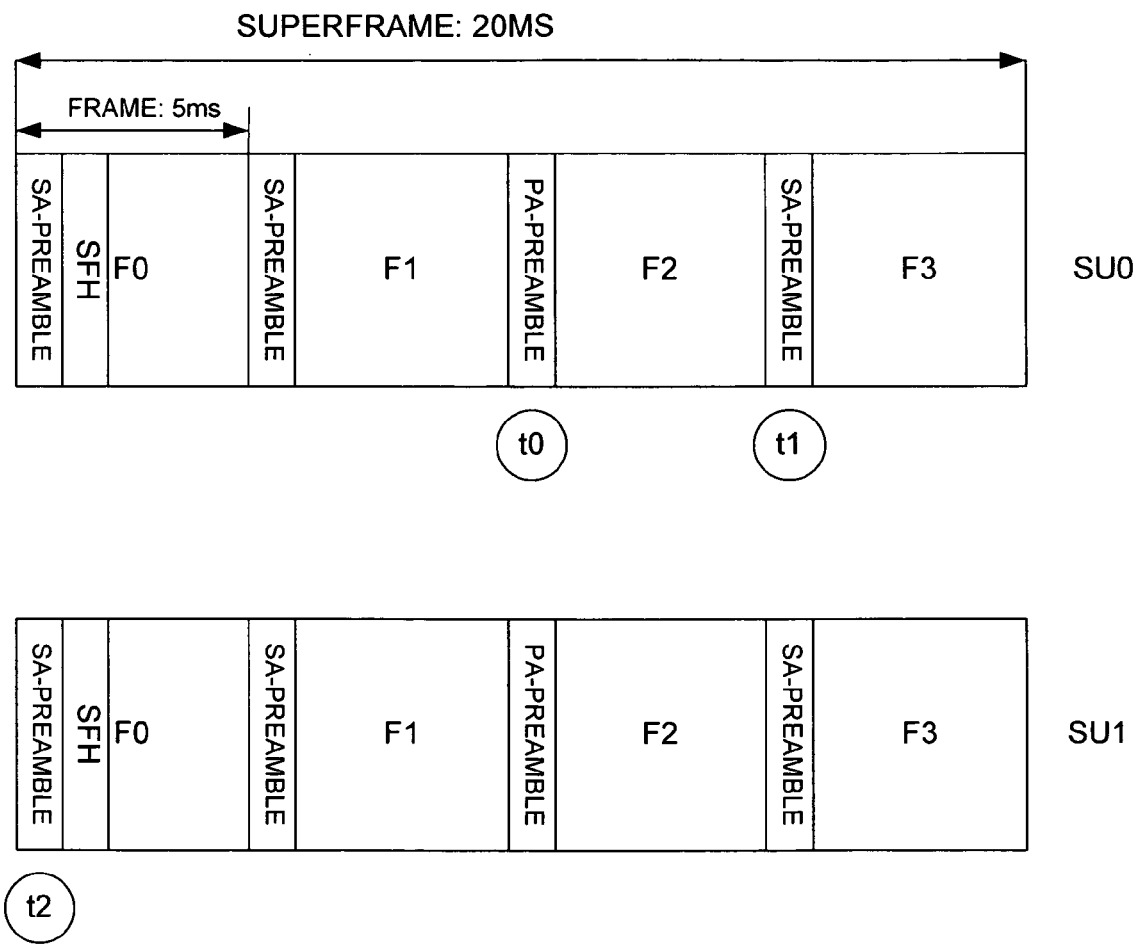
FIG. 4 illustrates a second SCH architecture that is used in a hierarchical synchronization scheme in an IEEE 802.16m system.

FIG. 4 illustrates a second embodiment of an SCH architecture that is used in a hierarchical synchronization scheme in an IEEE 802.16m system. This second embodiment is also referred to as an S-S-P-S preamble allocation scheme. In the S-S-P-S allocation scheme, each PA-Preamble is allocated in the first OFDM symbol of the third frame (F2) within each superframe, while three SA-Preambles are allocated in the first OFDM symbol of the first, second and fourth frames respectively within each superframe. As illustrated in FIG. 4, at time t0, the mobile station receives a first PA-preamble, which is located in the first OFDM symbol in F2 of a current superframe SU0. The mobile station performs OFDM symbol synchronization and acquires subframe SA-Preamble offset. At time t1, the mobile station receives a first SA-Preamble, which is located in the first OFDM symbol of F2 in SU0. The mobile station then starts to seek cell ID by detecting the received SA-Preamble sequence. At time t2, the mobile station receives a second SA-Preamble, which is located in the first OFDM symbol of F0 in the next superframe SU1. The mobile station seeks cell ID again if cell ID detection was failed at time t1.

Under good network condition, cell ID detection is most likely to be successful at this time. Therefore, at time t2, the mobile station can successfully decode the SFH information received in SU1 with faithfully detected complete cell ID information. The mobile station thus is able to start data communication with the base station at time t2. As a result, in this S-S-P-S SCH allocation scheme, network entry latency is reduced to 10 ms (2×5 ms). Because only two consecutive SA-Preambles are accumulated for cell ID detection, this S-S-P-S SCH allocation scheme has larger probability of cell ID detection failure as compared to the traditional preamble allocation scheme. However, in a network with good channel condition, S-S-P-S provides good tradeoff between low network entry latency and cell ID detection reliability.

Figure 5:
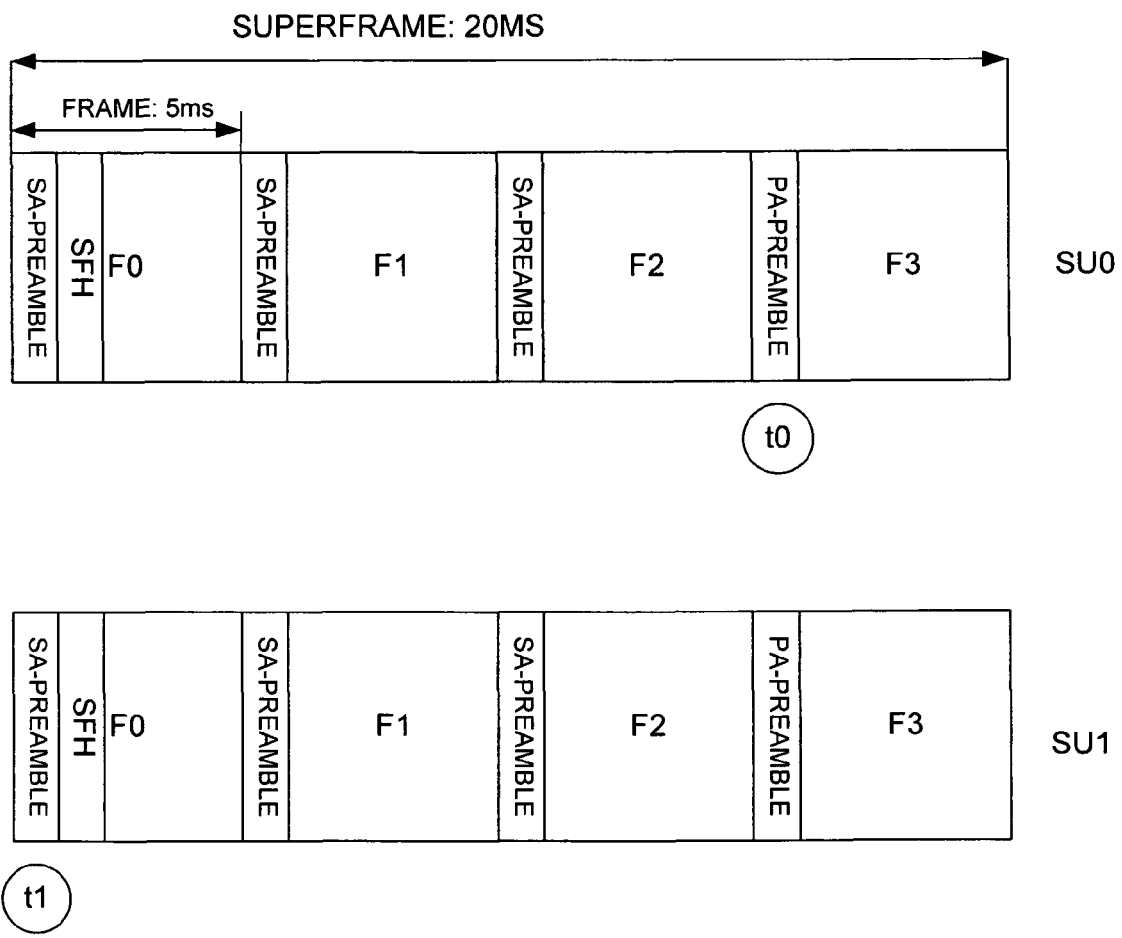
FIG. 5 illustrates a third SCH architecture that is used in a hierarchical synchronization scheme in an IEEE 802.16m system.

FIG. 5 illustrates a third embodiment of an SCH architecture that is used in a hierarchical synchronization scheme in an IEEE 802.16m system. This third embodiment is also referred to as an S-S-S-P preamble allocation scheme. In the S-S-S-P allocation scheme, each PA-Preamble is allocated in the first OFDM symbol of the fourth frame (F3) within each superframe, while three SA-Preambles are allocated in the first OFDM symbol of the first, second and third frames respectively within each superframe. As illustrated in FIG. 5, at time t0, the mobile station receives a first PA-preamble, which is located in the first OFDM symbol in F3 of a current superframe SU0. The mobile station performs OFDM symbol synchronization and acquires subframe SA-Preamble offset. At time t1, the mobile station receives a first SA-Preamble, which is located in the first OFDM symbol of F0 in the next superframe SU1. The mobile station starts to seek cell ID by detecting the received SA-Preamble sequence.

In a simple network configuration and good network channel condition with robust SA-Preamble design, the mobile station may able to perform cell ID detection using a single SA-Preamble. Therefore, at time t1, the mobile station can successfully decode the SFH information received in SU1 with faithfully detected complete cell ID information. The mobile station thus is able to start data communication with the base station at time t1. As a result, in this S-S-S-P SCH allocation scheme, network entry latency is reduced to five mille seconds. Because only one SA-Preamble is accumulated for cell ID detection, this S-S-S-P SCH allocation scheme has much larger probability of cell ID detection failure as compared to the traditional preamble allocation scheme. However, in a simple network configuration with excellent channel condition and robust SA-Preamble design, S-S-S-P provides minimum network entry latency with reasonable cell ID detection reliability.

With any of the preamble allocation schemes, it is possible that cell ID detection would fail before receiving the next SFH in the first round. According to traditional P-S-S-S, if cell ID detection fails in the first round, then cell ID detection is continually performed in the next superframe. This results in increasing network entry latency to 40 mille seconds. Similarly, first round cell ID detection failure would result in increasing network entry latency to 35 ms, 30 ms and 25 ms for S-P-S-S, S-S-P-S and S-S-S-P allocation schemes respectively. Overall, the proposed S-P-S-S preamble allocation scheme provides robust cell ID detection with reduced network entry latency. In addition, the proposed S-S-P-S preamble allocation schemes provide a good balance between high reliability of cell ID detection and low network entry latency, and the proposed S-S-S-P preamble allocation scheme provides minimum network entry latency with reasonable cell ID detection reliability for simple network configuration with good channel condition and robust SA-Preamble design.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for downlink synchronization in a cellular orthogonal frequency division multiple access (OFDMA) system, the method comprising:

allocating a primary advanced preamble (PA Preamble) in a second frame in an OFDM superframe having four frames including a first, the second, a third and a fourth frame along time domain, wherein the PA Preamble is allocated in a first OFDM symbol along time domain in the second frame;

allocating one or more secondary advanced preambles (SA Preambles) within the superframe, wherein the one or more SA Preambles are allocated in a corresponding first OFDM symbol along time domain in the first, the third, or the fourth frames; and transmitting the OFDM superframe by a base station, wherein the OFDM superframe further comprises a superframe header (SFH) that is located in the first frame of the OFDM superframe along time domain, and wherein the PA Preamble is allocated after the SFH such that the mobile station takes less than a superframe length to decode the SFH after decoding the PA Preamble and the SA Preambles for complete cell-ID information.

2. The method of claim 1, wherein the PA Preamble provides coarse timing synchronization and carries partial system information.

3. The method of claim 1, wherein each of the one or more SA Preambles carries complete cell-ID information.

4. The method of claim 1, wherein the PA Preamble comprises a preamble sequence that is the same among different base stations in the same frequency spectrum.

5. The method of claim 1, wherein each of the one or more SA Preambles comprises a preamble sequence that is unique among different base stations.

6. A base station in a cellular orthogonal frequency division multiple access (OFDMA) system, the base station comprising:
 a channel allocation module that allocates a primary advanced preamble (PA Preamble) and a plurality of secondary advanced preambles (SA Preambles) in an OFDM superframe having four frames including a first, a second, a third, and a fourth frame along time domain, wherein the PA Preamble is allocated in a first OFDM symbol along time domain in the second frame within the superframe, and wherein each SA Preamble is allocated in a corresponding first OFDM symbol along time domain in the first, the third, or the fourth frame within the superframe; and
 a transmitter that transmits the OFDM superframe, wherein the superframe further comprises a superframe header (SFH) that is located in the first frame of the OFDM superframe along time domain, and wherein the PA Preamble is allocated after the SFH such that the mobile station takes less than a superframe length to decode the SFH after decoding the PA Preamble and the SA Preambles for complete cell-ID information.

7. The base station of claim 6, wherein the PA Preamble provides coarse timing synchronization and carries partial system information.

8. The base station of claim 6, wherein each of the plurality of SA Preambles carries complete cell-ID information.

9. The base station of claim 6, wherein the PA Preamble comprises a preamble sequence that is the same among different base stations in the same frequency spectrum.

10. The base station of claim 6, wherein each of the plurality of SA Preambles comprises a preamble sequence that is unique among different base stations.

11. A method for downlink synchronization in a cellular orthogonal frequency division multiple access (OFDMA) system, the method comprising:
 allocating a superframe header (SFH) in a first frame of a OFDM superframe having four frames including a first, a second, a third and a fourth frame in time domain, wherein the superframe has a superframe length in time domain;
 allocating a Primary Advanced Preamble (PA Preamble) and one or more Secondary Advanced Preambles (SA Preambles) in each frame of the superframe; and
 transmitting the superframe to a mobile station, wherein the PA preamble is allocated in a first OFDM symbol along time domain in the second frame and the one or more SA Preambles are allocated in a corresponding first OFDM symbol along time domain in the first, the third, or the fourth frames such that the mobile station takes less than the superframe length to decode the SFH after decoding the PA Preamble and the SA Preambles for complete cell-ID information.

12. The method of claim 11, wherein the PA Preamble provides coarse timing synchronization and carries partial system information, and wherein each of the one or more SA Preambles carries complete cell-ID information.

* * * * *